(12) United States Patent
Nishida

(10) Patent No.: US 7,576,530 B2
(45) Date of Patent: Aug. 18, 2009

(54) SWITCHING REGULATOR CAPABLE OF EFFICIENT CONTROL AT CONTROL MODE CHANGE

(75) Inventor: Junji Nishida, Neyagawa (JP)

(73) Assignee: Ricoh Company, Ltd., Tokyo (JP)

( * ) Notice: Subject to any disclaimer, the term of this patent is extended or adjusted under 35 U.S.C. 154(b) by 146 days.

(21) Appl. No.: 11/898,624

(22) Filed: Sep. 13, 2007

(65) Prior Publication Data

US 2008/0174292 A1 Jul. 24, 2008

(30) Foreign Application Priority Data

Sep. 14, 2006 (JP) .............................. 2006-248993

(51) Int. Cl.
 *G05F 1/575* (2006.01)
 *G05F 1/563* (2006.01)
(52) U.S. Cl. ....................... 323/285; 323/284
(58) Field of Classification Search ................. 323/265, 323/271, 282, 284, 285, 351
See application file for complete search history.

(56) References Cited

U.S. PATENT DOCUMENTS 5,943,227 A * 8/1999 Bryson et al. .................. 363/95
7,061,213 B2 * 6/2006 Yoshida ......................... 323/224
7,221,129 B2 * 5/2007 Matsuo et al. ............... 323/222
7,408,333 B2 * 8/2008 Chen et al. .................... 323/282
2008/0061758 A1 * 3/2008 Nishida ........................ 323/284

FOREIGN PATENT DOCUMENTS

JP 2003-219637 7/2003

* cited by examiner

*Primary Examiner*—Gary L Laxton
(74) *Attorney, Agent, or Firm*—Dickstein Shapiro LLP

(57) ABSTRACT

A switching regulator includes a switching transistor to switch, an inductor to store charge from an input voltage, a comparator to compare a voltage at a connecting node of the switching transistor and the inductor with a predetermined voltage and generate a binary signal, a detector to detect a voltage difference between an output voltage and a predetermined reference voltage, a pulse generator to generate a pulse signal having a predetermined pulse width to switch the switching transistor on/off in VFM control mode, and a controller to determine the output voltage and select VFM or PWM control mode to make the output voltage a predetermined constant voltage. The controller changes the control mode from the VFM to the PWM control mode when the controller determines that the output voltage does not change while the pulse generator is outputting the pulse signal in the VFM control mode.

12 Claims, 3 Drawing Sheets

SWITCHING REGULATOR CAPABLE OF EFFICIENT CONTROL AT CONTROL MODE CHANGE

This patent application claims priority from Japanese Patent Application No. 2006-248993 filed on Sep. 14, 2006 in the Japan Patent Office, the entire contents of which are incorporated by reference herein.

BACKGROUND OF THE INVENTION

1. Field

This patent specification describes a switching regulator, and more particularly, a switching regulator capable of efficient control at control mode change.

2. Background Art

Recently, energy efficiency has been actively promoted as an environmental protection measure. For portable devices using batteries, such as mobile phones, digital cameras, and so on, energy efficiency is especially important in order to prolong battery life. Generally, to achieve energy efficiency, power consumption of the electronic device is lowered and unnecessary power consumption is reduced by improving the efficiency of a power circuit of the electronic device.

As the power circuit, used in a compact electronic device, a non-insulated type switching regulator employing an inductor is widely used. There are two main control modes to control the switching regulator. One is PWM (pulse width modulation) control mode and the other is VFM (variable frequency modulation) control mode.

In the PWM control mode, a duty cycle of a clock pulse having a constant frequency is changed to maintain an output voltage with a constant voltage value. By contrast, in the VFM control mode, a frequency of a clock pulse having a constant pulse width is changed in accordance with a deviation of the output voltage from a predetermined voltage.

In the PWM control mode, the switching transistor is switched on/off at a constant frequency even at a relatively light load, in which a small current flows into a load. In this light load condition, the performance efficiency of the switching regulator decreases. By contrast, in the VFM control mode, a frequency of a switching signal to switch the switching transistor is changed in accordance with the load condition. As a result, large noise and ripple for the device may be generated in comparison with the switching transistor using PWM control mode. However, the switching regulator using the VFM control mode can achieve higher performance efficiency than the performance efficiency using the PWM control mode under the relatively light load condition.

For the reason described above, both PWM and VFM control modes may be used by switching the two control modes in accordance with the load condition to obtain high performance efficiency in the power system in a wide range of load conditions, from light load to heavy load.

Generally, to detect the load condition, a detection resistor to detect an output current is connected between a power terminal that receives an input voltage and an output terminal. Then, an output current from the output terminal to the load is detected. However, in this method, as the output current increases, power consumption at the detection resistor increases. This power consumption is a large penalty for a compact electronic device using a battery.

Another device may use an indirect method that employs an error amplifier to detect an output voltage level instead of using the detection resistor to detect the output current. The error amplifier includes an integrating circuit to remove an effect of a ripple component superimposed on the output voltage. The integrating circuit is usually included as a phase compensation circuit of the error amplifier. Further, the integrating circuit is optimized to an operating frequency of the normal PWM control mode. Therefore, when the operating frequency becomes low or some pulses are removed from the pulse signal of the PWM control mode, the following problem occurs similar to the VFM control mode.

Specifically, immediately after start of a switching operation, the integrating circuit functions efficiently. However, when switching stops due to, for example, the removal of some pulses from the pulse signal of the PWM control mode, the output voltage of the error amplifier becomes 0 v or power supply voltage. As a result, the output signal of the integrating circuit may not be an efficient signal to detect the load current. For this reason, in the VFM control mode, the output voltage of the error amplifier cannot follow the load current and cannot be kept at a constant voltage value. Consequently, it is more difficult to set the load current accurately when the control mode changes in comparison with the method that uses the detection resistor to detect the output current.

SUMMARY

This patent specification describes a novel switching regulator that includes a switching transistor to switch, an inductor to store charge from an input voltage, a comparator to compare a voltage at a connecting node of the switching transistor and the inductor with a predetermined voltage and generate a binary signal, a detector to detect a voltage difference between an output voltage and a predetermined reference voltage, a pulse generator to generate a pulse signal having a predetermined pulse width to switch the switching transistor on/off in a VFM control mode, and a controller to determine the output voltage and select either the VFM control mode or a PWM control mode to make the output voltage a predetermined constant voltage. The controller changes the control mode from the VFM to the PWM control mode when the controller determines that the output voltage does not change while the pulse generator is outputting the pulse signal at the VFM control mode.

This patent specification further describes a novel semiconductor device that employs a switching regulator that includes a switching transistor to switch, an inductor to store charge from an input voltage, a comparator to compare a voltage at a connecting node of the switching transistor and the inductor with a predetermined voltage, and generate a binary signal, a detector to detect a voltage difference between an output voltage and a predetermined reference voltage, a pulse generator to generate a pulse signal having a predetermined pulse width to switch the switching transistor on/off in a VFM control mode, and a controller to determine the output voltage and select either the VFM control mode or a PWM control mode to make the output voltage a predetermined constant voltage. The controller changes the control mode from the VFM to the PWM control mode when the controller determines that the output voltage does not change while the pulse generator is outputting the pulse signal at the VFM control mode.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
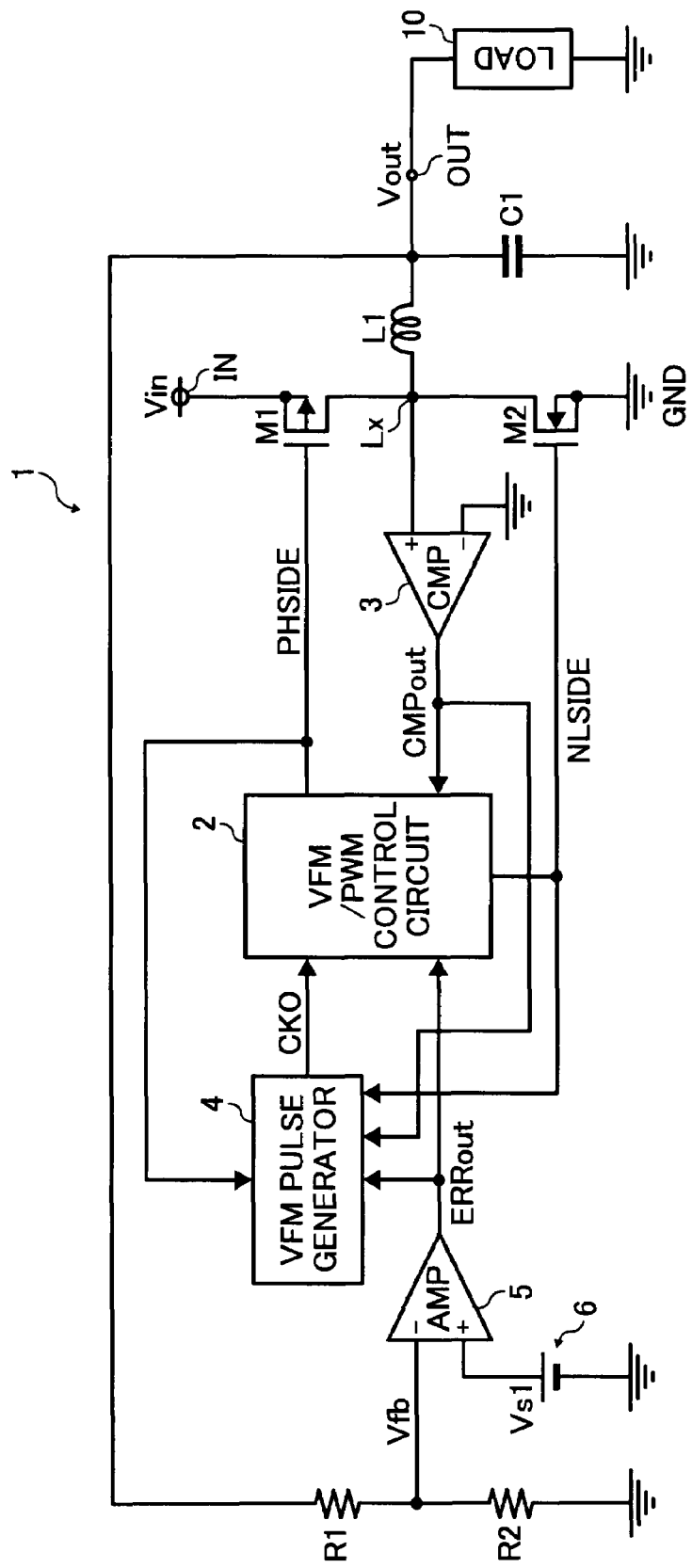
FIG. 1 illustrates a switching regulator according to a first exemplary embodiment of the invention.

In describing certain preferred embodiments illustrated in the drawings, it is to be noted that specific terminology is employed solely for the sake of clarity. Accordingly, the disclosure of the present patent specification is not intended to be limited to the specific terminology so selected, and it is therefore to be understood that each specific element includes all technical equivalents that operate in a similar manner.

Referring now to the drawings, wherein like reference numerals designate identical or corresponding parts throughout the several views, switching regulators according to certain example embodiments are described.

FIG. 1 illustrates a switching regulator 1 according to a first such exemplary embodiment. The switching regulator 1 converts an input voltage Vin input at an input terminal IN to a predetermined lower voltage than the input voltage Vin and outputs the converted voltage as an output voltage from an output terminal OUT to a load 10.

The switching regulator 1 is a non-insulating type switching regulator and includes a switching transistor M1 and a synchronization rectification transistor M2 formed of an NMOS transistor. The switching transistor M1 is formed of a PMOS transistor that controls the input voltage Vin to output. Further, the switching regulator 1 includes a VFM/PWM control circuit 2, a comparator 3, a VFM pulse generator 4, an error amplifier 5, output-voltage-detection resistors R1 and R2 to detect the output voltage, a first reference voltage generator 6, a capacitor C1, and an inductor L1. The output-voltage-detection resistors R1 and R2 generate a partial voltage Vfb by dividing the output voltage Vout. The first reference voltage generator 6 generates a first predetermined reference voltage Vs1.

The VFM/PWM control circuit 2 forms a control circuit unit. The comparator 3 forms a voltage comparison circuit unit, and the VFM pulse generator 4 forms a pulse generation circuit unit. The error amplifier 5, first reference voltage generator 6, and the output-voltage-detection resistors R1 and R2 form an output voltage detection circuit unit. Excepting the capacitor C1 and the inductor L1, all these circuit units may be integrated on a single chip. In some case, the circuit units may be integrated on a single chip except for the switching transistor M1, a synchronization rectification transistor M2, the capacitor C1, and the inductor L1. The switching regulator 1 may be integrated into a semiconductor device that operates a predetermined function.

The switching transistor M1 and the synchronization rectification transistor M2 are connected in series between the input terminal IN and ground GND. The inductor L1 is connected between the output terminal OUT and a connecting node Lx at which the switching transistor M1 and the synchronization rectification transistor M2 are connected. The capacitor C1 is connected between the output terminal OUT and ground GND.

As for the comparator 3, a non-inverted terminal is wired to the connecting node Lx and an inverted terminal is wired to ground GND. The comparator 3 compares a voltage at the connecting node Lx with ground voltage, generates a binary signal CMPout that indicates a comparison result, and outputs the binary signal CMPout to the VFM/PWM control circuit 2 and the VFM pulse generator 4, respectively.

A[MSoffice1] connecting node of the output-voltage-detection transistors R1 and R2 is wired to an inverted terminal of the error amplifier. 5. The first reference voltage Vs1 is input to a non-inverted terminal of the error amplifier 5.

The error amplifier 5 compares the partial voltage Vfb with the reference voltage Vs1, generates a binary signal ERRout that indicates a comparison result of the error amplifier 5, and outputs the binary signal ERRout to the VFM/PWM control circuit 2 and the VFM pulse generator 4, respectively. The VFM pulse generator 4 generates a pulse signal CKO which controls on-time of the switching transistor M1 at the VFM control mode, and outputs the pulse signal CKO to the VFM/PWM control circuit 2.

Each gate of the switching transistor M1 and the synchronization rectification transistor M2 is connected to the VFM/PWM control circuit 2. A control signal PHSIDE is input to the gate of the switching transistor M1 and a control signal NLSIDE is input to the gate of the synchronization rectification transistor M2. Further, the control signals PHSIDE and NLSIDE are input to the VFM pulse generator 4, respectively.

Figure 2:
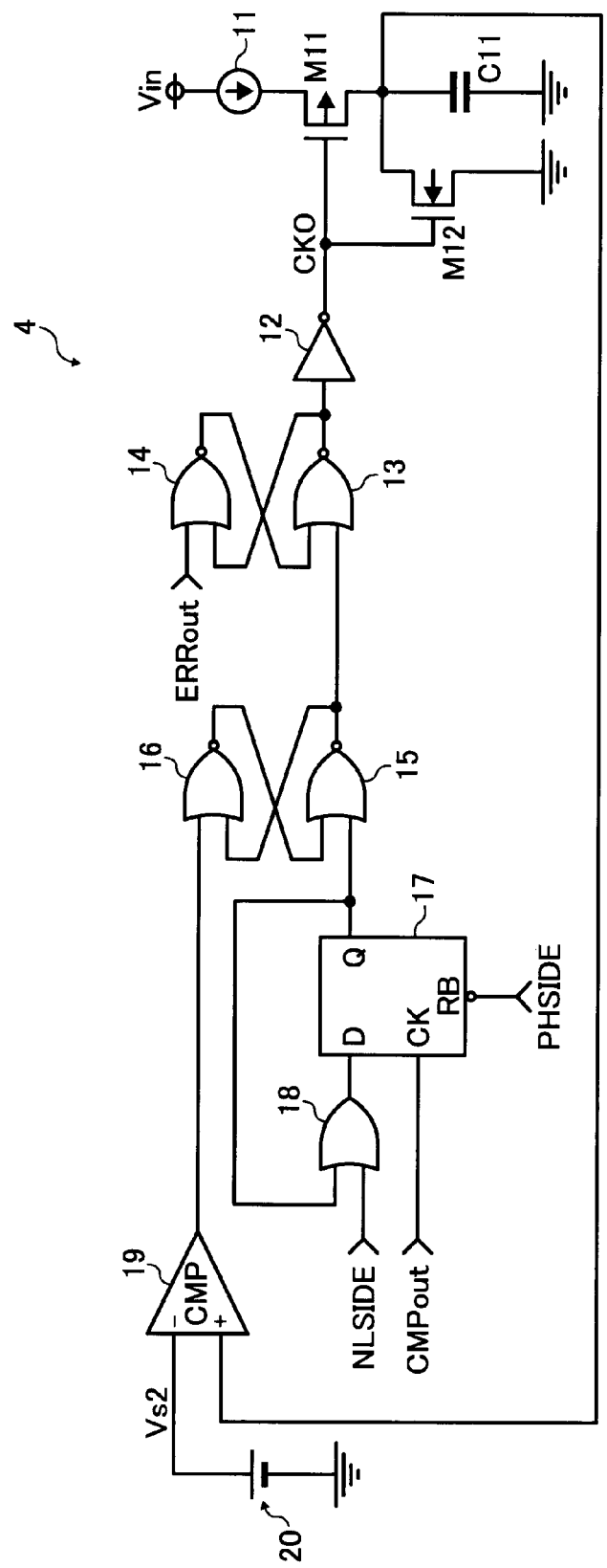
FIG. 2 illustrates an example of a VFM pulse generator used in the switching regulator shown in FIG. 1.

FIG. 2 illustrates example circuitry of the VFM pulse generator 4. The VFM pulse generator 4 includes a PMOS transistor M11, an NMOS transistor M12, a capacitor C11, a constant current source 11, an inverter 12, NOR circuits 13, 14, 15 and 16, a D-flip-flop 17, an OR circuit 18, a comparator 19, and a second reference voltage generator 20. The second reference voltage generator 20 generates a predetermined second reference voltage Vs2.

The constant current source 11, the PMOS transistor M11, and the NMOS transistor M12 are connected in series between the input terminal IN and ground GND. The capacitor C11 is connected in parallel to the NMOS transistor M12. A connecting node of the PMOS transistor M11 and the NMOS transistor M12 is wired to a non-inverted input terminal of the comparator 19. The second reference voltage Vs2 is input to the inverted input terminal of the comparator 19.

The NOR circuits 15 and 16 form a reset-set flip-flop (RS-flip-flop). One input terminal of the NOR circuit 16 is connected to an output terminal of the comparator 19. Another input terminal of the NOR circuit 16 is connected to an output terminal of the NOR circuit 15. One input terminal of NOR circuit 15 is wired to an output terminal of the NOR circuit 16 and another input terminal of the NOR circuit 15 is connected to an output terminal Q of the D-flip-flop 17.

One input terminal of the OR circuit 18 is connected to the output terminal Q of the D-flip-flop 17. The control signal NLSIDE is input to another input terminal of the OR circuit 18. An output terminal of the OR circuit 18 is wired to an input terminal D of the D-flip-flop 17. The signal CMPout is input to a clock input terminal CK of the D-flip-flop 17. The control signal PHSIDE is input to a reset input terminal RB of the D-flip-flop 17.

The NOR circuits 13 and 14 form a RS-flip-flop. One input terminal of the NOR circuit 13 is connected to an output terminal of the NOR circuit 14. Another input terminal of the NOR circuit 13 is connected to the output terminal of the NOR circuit 15. The signal ERRout is input to one input terminal of the NOR circuit 14. Another input terminal of the NOR circuit 14 is connected to an output terminal of the NOR circuit 13. The output terminal of the NOR circuit 13 is connected to each gate of the PMOS transistor M11 and the NMOS transistor M12 through the inverter 12. The inverter 12 outputs the pulse signal CKO from an output terminal of the inverter 12.

In this circuit configuration, the VFM/PWM control circuit 2 selects either VFM control mode or PWM control mode. More specifically, the VFM/PWM control circuit 2 selects the VFM control mode under a light load condition in which a load current flowing through the load 10 is relatively small and selects the PWM control mode under a heavy load condition in which the load current is relatively large. In the selected control mode, the VFM/PWM control circuit 2 outputs the control signal PHSIDE to the switching transistor M1 and the control signal NLSIDE to the synchronization rectification transistor M2, respectively. Further, the control signal CMPout is output from the comparator 3 which detects whether or not an excitation energy of the inductor L1 is zero, and is input to the VFM/PWM control circuit 2.

The VFM/PWM control circuit 2 sets the control signal NLSIDE to a low level to switch the synchronization rectification transistor M2 off, when the VFM/PWM control circuit 2 detects that the excitation energy of the inductor L1 is zero based on the control signal CMPout. This operation is to avoid a reverse current due to a discharge of a charge stored in the capacitor C1 to ground GND through the inductor L1 and the synchronization rectification transistor M2.

The binary signal ERRout, which indicates the comparison result obtained by comparing the partial voltage Vfb with the first reference voltage Vs1, is input to the VFM/PWM control circuit 2. Therefore, the VFM/PWM control circuit 2 generates and outputs the control signal PHSIDE for the switching transistor M1 based on the binary signal ERRout to maintain the output voltage at a predetermined constant voltage value. Further, the VFM/PWM control circuit 2 outputs the pulse signal CKO as a control signal PHSIDE in the VFM control mode.

When the binary signal ERRout of the error amplifier 5 is high, the VFM pulse generator 4 generates and outputs a pulse signal CKO having a pulse width of a high level determined by a current supplied from the current source 11, a capacity of the capacitor C11, and the predetermined second reference voltage Vs2. Further, when the pulse signal CKO falls to low, the VFM pulse generator 4 does not generate a pulse signal CKO having a high level until the pulse signal CMPout from the comparator 3 rises to high. In other words, this operation is such that the VFM pulse generator 4 does not generate a pulse signal CKO having a high level in the VFM control mode until it is determined that the excitation energy during one switching cycle is zero.

Since the switching regulator 1 is operating under a light load condition when the VFM control mode is selected, the switching regulator 1 performs a discontinuity mode operation.

Figure 3:
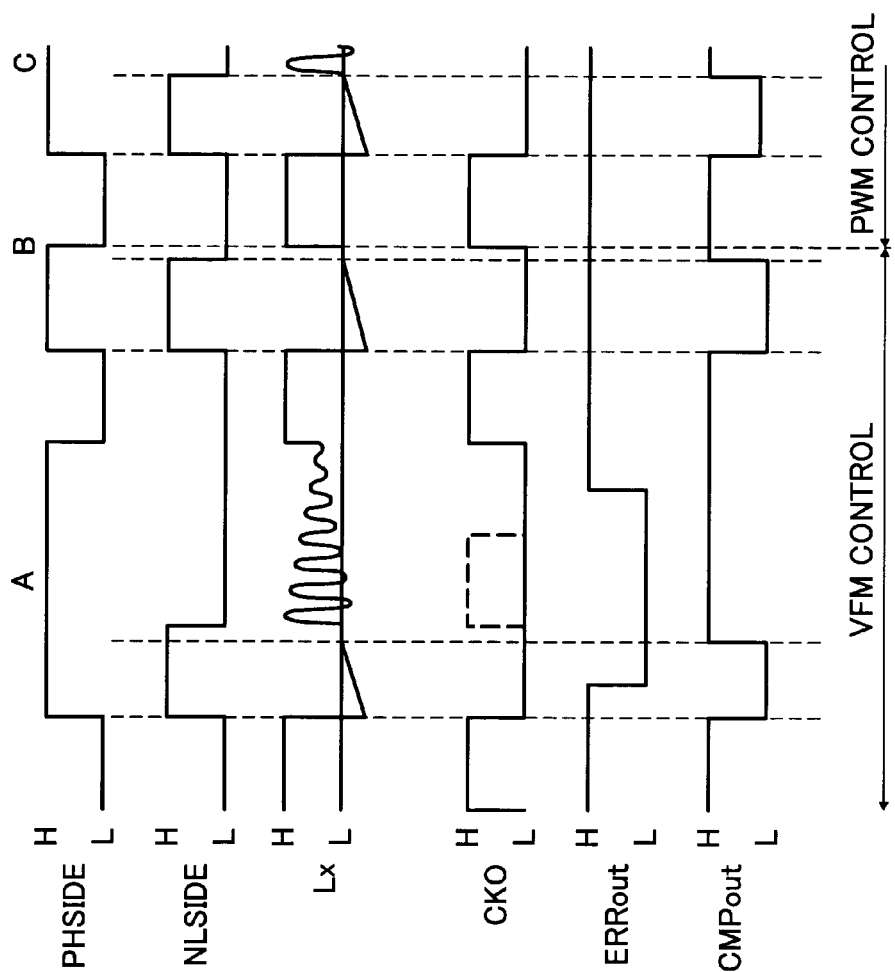
FIG. 3 illustrates timing waveforms of the switching regulator shown in FIG. 1.

Referring to FIG. 3, an operation of the switching regulator 1 is now described.

FIG. 3 is a timing chart illustrating example waveforms of each signal in the VFM mode operation. FIG. 3 illustrates an operation in which an inverted signal of the pulse signal CKO is used as the control signal PHSIDE.

When a load current is decreased, an inductance current flowing through the inductor L1 is decreased and energy [MSoffice2] stored in the inductor L1 is also decreased. The energy stored in the inductor L1 may be released completely within a time period lasting from a time the switching transistor M1 turns off to a time before the switching transistor M1 turns on again. The charge stored in the capacitor C1 connected to the output terminal OUT may discharge to ground GND through the inductor L1 and the synchronization rectification transistor M2. In this state, it may be possible that a reverse current is being generated, with the result that the efficiency of the switching regulator 1 then decreases dramatically.

While the switching regulator 1 is operating in this state, a voltage at the connecting node Lx takes a positive value. The binary signal CMPout from the comparator 3 rises to high. Then, the VFM/PWM control circuit 2 makes the control signal NLSIDE low, supplies the control signal NLSIDE to the synchronization rectification transistor M2, and turns the synchronization rectification transistor M2 off to shut down. Thus, generation of the reverse current is avoided and degradation of the performance efficiency of the switching regulator 1 is avoided.

A time period from a time the voltage at the connecting node Lx becomes positive to a time the switching transistor M1 turns on is called an idle period. One frame operation at a control cycle in the discontinuity mode is performed during a summation time of an on-time of the switching transistor M1, an on-time of the synchronization rectification transistor M2, and the idle period at a discontinuity mode operation.

As previously described, when the VFM/PWM control circuit 2 selects the VFM mode, the VFM pulse generator 4 generates and outputs the pulse signal CKO in response to detection of the discontinuity mode by detecting a signal change that the binary signal CMPout from the comparator 3 rises to high. Therefore, the switching regulator 1 only performs the discontinuity mode operation in this condition.

The VFM/PWM control circuit 2 changes the control mode from the VFM control mode to PWM control mode when the binary signal ERRout of the error amplifier 5 does not change at the discontinuity mode operation even when the excitation energy during one switching cycle is zero. In other words, the VFM/PWM control circuit 2 changes the control mode from the VFM control mode to PWM control mode when the binary signal ERRout stays high during a time period from a time the pulse signal CKO rises to high to a time the pulse signal CKO rises again to high.

The idle period is a time period during which the switching regulator 1 is in a shutdown state by shutting both transistors off, i.e., the switching transistor M1 and the synchronization rectification transistor M2 are turned off. As a result, the excitation energy of the inductor L1 becomes zero during the idle period. Referring to FIG. 3, it can be seen that when the excitation energy of the inductor L1 is zero, the binary signal CMPout that is the detection signal of the discontinuity mode rises to high from low. When the binary signal ERRout of the error amplifier 5 indicating output error voltage is low, it is possible for the VFM/PWM control circuit 2 to determine that the output voltage Vout can be maintained with the energy supplied during one switching cycle.

As illustrated by period A and period B shown in FIG. 3, when the VFM/PWM control circuit 2 determines that the output voltage Vout can be managed by the energy supplied during one switching cycle, the VFM/PWM control circuit 2 maintains the VFM control mode. Further, when the binary signal ERRout becomes high again, the VFM pulse generator 4 outputs the pulse signal CKO to supply energy.

By contrast, the VFM/PWM control circuit 2 determines that the output voltage Vout cannot be maintained with the energy supplied during one switching cycle when the binary signal ERRout is high when the control signal CMPout rises to high. If the VFM/PWM control circuit 2 determines that the output voltage Vout cannot be maintained with the energy supplied during one switching cycle, the VFM/PWM control circuit 2 changes the control mode from the VFM control mode to PWM control mode.

In the VFM pulse generator 4 as described, the pulse width of the pulse signal CKO is determined by the current supplied from the current source 11, the capacity of the capacitor C11, and the predetermined second reference voltage Vs2. Further, the pulse signal CKO is generated in accordance with the control signal CMPout that is the detection signal of the discontinuity mode. As a result, an energy amount supplied during one switching cycle is determined by the pulse width of pulse signal CKO that the VFM pulse generator 4 determines.

If the VFM/PWM control circuit 2 detects that the energy supplied during one switching cycle is not enough to maintain the output voltage, the VFM/PWM control circuit 2 changes the mode from the VFM control mode to PWM control mode. The load current at a timing of the mode change can be determined with any current value by changing the pulse width of the pulse signal CKO.

Thus, according to one example embodiment of the switching regulator, the pulse width of the pulse signal CKO generated by the VFM pulse generator 4 is determined by the current supplied from the current source 11, the capacity of the capacitor C11, and the predetermined reference voltage Vs2. The pulse signal CKO is generated in accordance with the control signal CMPout that is the detection signal to detect the fact that the excitation energy of the inductor L1 is zero. The energy amount supplied during one switching cycle is determined by the pulse width of pulse signal CKO that the VFM pulse generator 4 determines.

If the VFM/PWM control circuit 2 detects that the energy supplied during one switching cycle is not enough to maintain the output voltage, the VFM/PWM control circuit 2 changes the control mode from the VFM control mode to PWM control mode. The load current at the time the control mode is changed can be set with any current value by changing the pulse width of the pulse signal CKO.

As a result, the load current at the time the control mode is changed can be determined precisely in accordance with the load condition without using a resistor for output current detection.

In the foregoing description, a step-down switching regulator using synchronous operation that converts an input voltage to a predetermined lower voltage than the input voltage as an output voltage is described. However, as can be appreciated by those skilled in the art, the teaching of this disclosure is not limited to the above-described regulator but can be applied to any switching regulator, for example, a switching regulator using non synchronous operation or a step-up switching regulator that converts an input voltage to a predetermined higher voltage than the input voltage as an output voltage.

Further, in the foregoing description, the VFM/PWM control circuit 2 changes the control mode from the VFM control mode to PWM control mode when the binary signal ERRout does not change but stays high during one switching cycle, which is a time period from a time the pulse signal CKO rises to a high level to a time the pulse signal CKO rises again. Alternatively, however, the VFM/PWM control circuit 2 may change the control mode from the VFM control mode to the PWM control mode when the binary signal ERRout does not change but stays high during a plurality of switching cycles.

Numerous additional modifications and variations are possible in light of the above teachings. It is therefore to be understood that, within the scope of the appended claims, the disclosure of this patent specification may be practiced otherwise than as specifically described herein.

What is claimed is:

1. A switching regulator, comprising:
   a switching transistor configured to switch in accordance with a control signal;
   an inductor configured to store charge from an input voltage by switching the switching transistor;
   a comparator configured to compare a voltage at a connecting node of the switching transistor and the inductor with a predetermined voltage that indicates an excitation energy of the inductor becoming zero, and generate a binary signal indicating a comparison result;
   a detector configured to detect a voltage difference between an output voltage at an output terminal and a predetermined reference voltage, and output a detection signal;
   a pulse generator configured to generate a pulse signal having a predetermined pulse width to switch the switching transistor on/off in VFM control mode; and
   a controller configured to determine the output voltage and select either VFM control mode or PWM control mode with the switching transistor to make the output voltage a predetermined constant voltage,
   wherein the controller changes the control mode from the VFM control mode to the PWM control mode when the controller determines that the output voltage does not change while the pulse generator is outputting the pulse signal in the VFM control mode based on the output signal of the detector.

2. The switching regulator of claim 1, wherein the controller changes the control mode from the VFM control mode to the PWM control mode when the controller determines that the output voltage does not change during one cycle of the pulse signal output from the pulse generator in the VFM control mode based on the output signal of the detector.

3. The switching regulator of claim 1, wherein the controller detects a voltage change at the output terminal when an output signal of the comparator changes.

4. The switching regulator of claim 1, wherein the pulse generator generates the pulse signal in accordance with an output signal of the comparator, and outputs the generated pulse signal in accordance with the output signal of the comparator.

5. The switching regulator of claim 4, wherein the pulse generator generates the pulse signal when the voltage of the connecting node of the switching transistor and the inductor becomes the predetermined voltage based on the output signal of the comparator, and outputs the generated pulse signal when the output voltage of the detector is below a predetermined voltage based on the output signal of the detector.

6. The switching regulator of claim 4, wherein the pulse generator sets a pulse width of the pulse signal and the controller determines an output current value outputting from the output terminal when the control mode changes from the VFM control mode to the PWM control mode in accordance with the setting of the pulse width of the pulse signal.

7. A semiconductor device employing a switching regulator, the switching regulator comprising:
   a switching transistor configured to switch in accordance with a control signal;
   an inductor configured to store charge from an input voltage by switching the switching transistor;
   a comparator configured to compare a voltage at a connecting node of the switching transistor and the inductor with a predetermined voltage that indicates an excitation energy of the inductor becoming zero, and generated binary signal indicating a comparison result;
   a detector configured to detect a voltage difference between an output voltage at an output terminal and a predetermined reference voltage, and output a detection signal;

a pulse generator configured to generate a pulse signal having a predetermined pulse width to switch the switching transistor on/off in VFM control mode; and a controller configured to determine the output voltage, and to select either VFM control mode or PWM control mode with the switching transistor to make the output voltage a predetermined constant voltage, wherein the controller changes the control mode from the VFM control mode to PWM control mode when the controller determines that the output voltage does not change while the pulse generator is outputting the pulse signal in the VFM control mode based on the output signal of the detector.

8. The semiconductor device of claim 7, wherein the controller changes the control mode from the VFM control mode to the PWM control mode when the controller determines that the output voltage does not change during one cycle of the pulse signal output from the pulse generator in the VFM control mode based on the output signal of the detector.

9. The semiconductor device of claim 7, wherein the controller detects a voltage change at the output terminal when an output signal of the comparator changes.

10. The semiconductor device of claim 7, wherein the pulse generator generates the pulse signal in accordance with an output signal of the comparator, and outputs the generated pulse signal in accordance with the output signal of the comparator.

11. The semiconductor device of claim 10, wherein the pulse generator generates the pulse signal when the voltage of the connecting node of the switching transistor and the inductor becomes the predetermined voltage based on the output signal of the comparator, and outputs the generated pulse signal when the output voltage of the detector is below the predetermined voltage based on the output signal of the detector.

12. The semiconductor device of claim 10, wherein the pulse generator sets a pulse width of the pulse signal, and the controller determines an output current value outputting from the output terminal when the control mode changes from the VFM control mode to the PWM control mode in accordance with the setting of the pulse width of the pulse signal.

* * * * *